US010733438B2

(12) United States Patent
Osuga et al.

(10) Patent No.: US 10,733,438 B2
(45) Date of Patent: Aug. 4, 2020

(54) EYEBALL INFORMATION DETECTION DEVICE, EYEBALL INFORMATION DETECTION METHOD, AND OCCUPANT MONITORING DEVICE

(71) Applicant: AISIN SEIKI KABUSHIKI KAISHA, Kariya-shi, Aichi-ken (JP)

(72) Inventors: Shin Osuga, Nagoya (JP); Takashi Kato, Aichi-ken (JP); Yuya Yamada, Tokyo (JP); Yuta Kawai, Kuwana (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 16/578,735

(22) Filed: Sep. 23, 2019

(65) Prior Publication Data

US 2020/0104590 A1 Apr. 2, 2020

(30) Foreign Application Priority Data

Sep. 27, 2018 (JP) .................................. 2018-181951

(51) Int. Cl.
*G06K 9/00* (2006.01)
*G06T 7/70* (2017.01)

(52) U.S. Cl.
CPC ..... *G06K 9/00604* (2013.01); *G06K 9/00832* (2013.01); *G06T 7/70* (2017.01); *G06T 2207/20081* (2013.01); *G06T 2207/30201* (2013.01); *G06T 2207/30268* (2013.01)

(58) Field of Classification Search
CPC ... G06K 9/00604; G06K 9/00832; G06T 7/70
USPC ........................................................ 382/103
See application file for complete search history.

(56) References Cited

U.S. PATENT DOCUMENTS

2006/0035259 A1\* 2/2006 Yokouchi ........... G06K 9/00248
435/6.1
2016/0239715 A1\* 8/2016 Nagai ..................... G08B 21/06
2018/0096475 A1\* 4/2018 Jemander ............. G08B 29/188

FOREIGN PATENT DOCUMENTS

JP 2009-254691 A 11/2009

\* cited by examiner

*Primary Examiner* — Michael R Neff
(74) *Attorney, Agent, or Firm* — Sughrue Mion, PLLC (57) ABSTRACT

An eyeball information detection device includes: an acquisition unit configured to acquire a captured image obtained by imaging a region in which there is a probability that a face of an occupant is present in a vehicle by an imaging device provided in proximity to an illumination device that emits light to the region; and a detection unit configured to output eyeball information that corresponds to the captured image by receiving the captured image acquired by the acquisition unit as an input based on a learned model generated by learning a learning image including information similar to the captured image acquired by the acquisition unit and a correct value of the eyeball information on an eyeball of the occupant appearing in the learning image, by machine learning.

3 Claims, 8 Drawing Sheets

EYEBALL INFORMATION DETECTION DEVICE, EYEBALL INFORMATION DETECTION METHOD, AND OCCUPANT MONITORING DEVICE

CROSS REFERENCE TO RELATED APPLICATIONS

This application is based on and claims priority under 35 U.S.C. § 119 to Japanese Patent Application 2018-181951, filed on Sep. 27, 2018, the entire contents of which are incorporated herein by reference.

TECHNICAL FIELD

This disclosure relates to an eyeball information detection device, an eyeball information detection method, and an occupant monitoring device.

BACKGROUND DISCUSSION

In the related art, techniques for detecting eyeball information on the eyeballs of an occupant, such as a pupil position of the occupant, based on a captured image obtained by imaging a face of the occupant of a vehicle with an imaging device, have been studied.

In general, in the captured image, the eyes appear as red eyes or appear in other forms in accordance with the condition of light. Here, JP 2009-254691A (Reference 1) discloses a method for detecting eyeball information regardless of variation in how the eyes appear in the captured image, using two types of illumination including illumination for emitting light toward the face (eyes) of an occupant from a direction the same as an imaging direction and illumination for emitting light toward the face (eyes) of the occupant from a direction different from the imaging direction, based on a difference between two types of captured images including a captured image acquired when the light is emitted by the former illumination and a captured image acquired when the light is emitted by the latter illumination.

However, in the related art described above, in order to emit the light from different directions to the same position, it is necessary to dispose the two types of illumination at positions separated from each other to some extent, and thus, the degree of freedom in design and layout of a vehicle interior deteriorates while detection accuracy of eyeball information is ensured.

Thus, a need exists for an eyeball information detection device, an eyeball information detection method, and an occupant monitoring device which are not susceptible to the drawback mentioned above.

SUMMARY

An eyeball information detection device as an example of this disclosure includes: an acquisition unit configured to acquire a captured image obtained by imaging a region in which there is a probability that a face of an occupant is present in a vehicle by an imaging device provided in proximity to an illumination device that emits light to the region; and a detection unit configured to output eyeball information that corresponds to the captured image by receiving the captured image acquired by the acquisition unit as an input based on a learned model generated by learning a learning image including information similar to the captured image acquired by the acquisition unit and a correct value of the eyeball information on an eyeball of the occupant appearing in the learning image, by machine learning.

According to the above-described eyeball information detection device, it is possible to obtain an output based on the correct value of the eyeball information by using the learned model in a configuration in which the illumination device and the imaging device are provided in proximity to each other. Therefore, it is possible to detect the eyeball information with high accuracy without deterioration of the degree of freedom in design and layout in the vehicle interior.

An eyeball information detection method as an example of this disclosure includes: an acquiring step of acquiring a captured image obtained by imaging a region in which there is a probability that a face of an occupant is present in a vehicle by an imaging device provided in proximity to an illumination device that emits light to the region; and a detecting step of outputting eyeball information that corresponds to the captured image by receiving the captured image acquired in the acquiring step as an input based on a learned model generated by learning a learning image including information similar to the captured image acquired in the acquiring step and a correct value of the eyeball information on eyeballs of the occupant appearing in the learning image, by machine learning.

According to the above-described eyeball information detection method, it is possible to obtain an output based on the correct value of the eyeball information by using the learned model in a configuration in which the illumination device and the imaging device are provided in proximity to each other. Therefore, it is possible to detect the eyeball information with high accuracy without deterioration of the degree of freedom in design and layout in the vehicle interior.

An occupant monitoring device as an example of this disclosure includes: an acquisition unit configured to acquire a captured image obtained by imaging a region in which there is a probability that a face of an occupant is present in a vehicle by an imaging device provided in proximity to an illumination device that emits light to the region; a detection unit configured to output eyeball information that corresponds to the captured image by receiving the captured image acquired by the acquisition unit as an input based on a learned model generated by learning a learning image including information similar to the captured image acquired by the acquisition unit and a correct value of the eyeball information on an eyeball of the occupant appearing in the learning image by machine learning; and a processing unit that monitors a change in a sight line of the occupant based on the eyeball information output from the detection unit.

According to the above-described occupant monitoring device, it is possible to obtain an output based on the correct value of the eyeball information by using the learned model in a configuration in which the illumination device and the imaging device are provided in proximity to each other. Therefore, it is possible to detect the eyeball information with high accuracy and to monitor a change in a sight line of the occupant with high accuracy, without deterioration of the degree of freedom in design and layout in the vehicle interior.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of the disclosure will be described based on the drawings. The configurations of the embodiment described below, and the operations and results (effects) achieved by the configurations are merely examples, and the disclosure is not limited to the following description.

Figure 1:
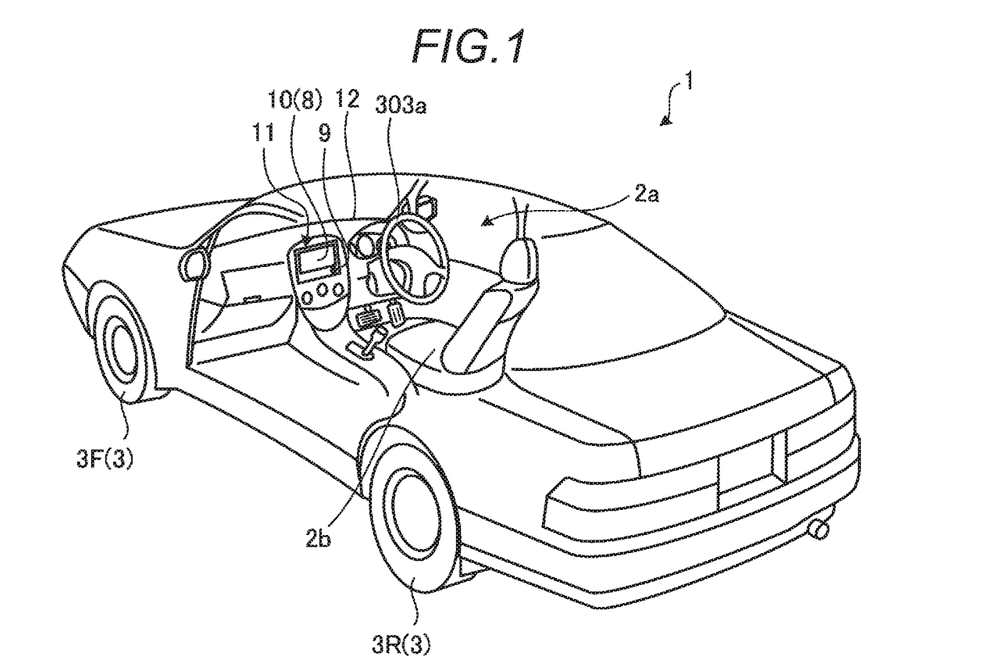
FIG. 1 is an exemplary schematic view illustrating an example of a configuration of a vehicle according to an embodiment.
Figure 2:
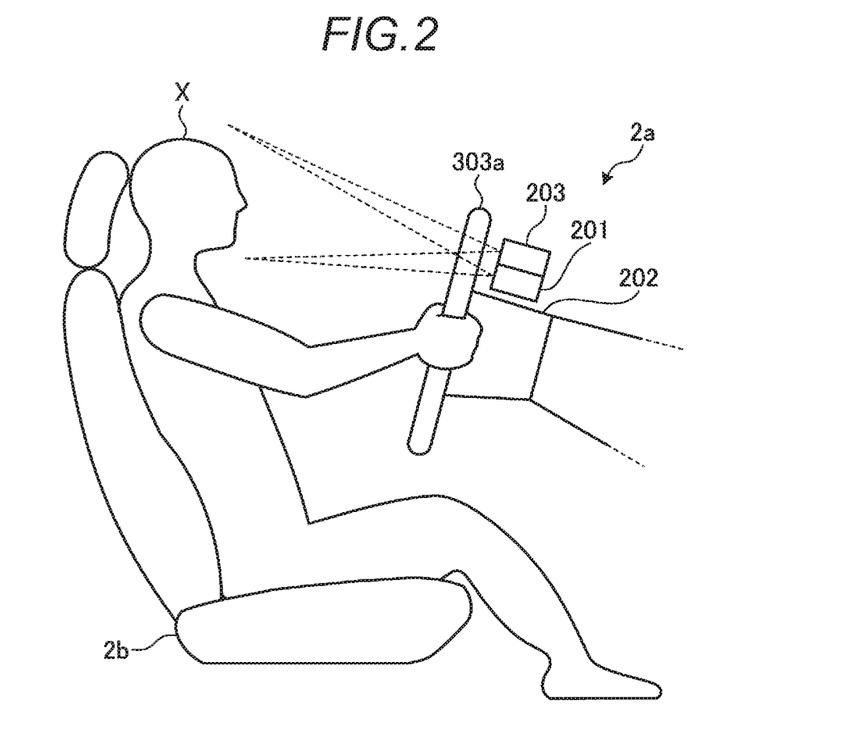
FIG. 2 is an exemplary schematic view illustrating an example of disposition of an imaging device and an illumination device provided in the vehicle according to the embodiment.

First, a schematic configuration of a vehicle 1 according to the embodiment will be described with reference to FIGS. 1 and 2. FIG. 1 is an exemplary schematic view illustrating an example of the configuration of the vehicle 1 according to the embodiment, and FIG. 2 is an exemplary schematic view illustrating an example of disposition of an imaging device 201 and an illumination device 203 provided in the vehicle 1 according to the embodiment.

As illustrated in FIG. 1, the vehicle 1 according to the embodiment is a four-wheeled automobile having two left and right front wheels 3F and two left and right rear vehicle wheels 3R. Hereinafter, for the sake of simplicity, there is a case where the front wheels 3F and the rear vehicle wheels 3R are collectively referred to as a wheel 3. In the embodiment, the sideslip angle of a part or all of the four wheels 3 is changed (steered) in accordance with the steering of a steering unit 303a and the like.

Further, as illustrated in FIG. 1, the vehicle 1 according to the embodiment has a vehicle interior 2a in which an occupant (not illustrated in FIG. 1) is onboard. In the vehicle interior 2a, a steering unit 303a is provided in a state where a driver X (not illustrated in FIG. 1) as an occupant can operate from a driving seat 2b. The steering unit 303a is configured as, for example, a steering wheel provided to protrude from a dashboard (instrument panel) 12. In the embodiment, it is needless to say that there may be seats other than the driving seat 2b in the vehicle interior 2a.

Further, a monitor device 11 having a display unit 8 capable of outputting various types of images and a voice output unit 9 capable of outputting various types of sounds is provided in the vehicle interior 2a. The monitor device 11 is provided, for example, at a center portion in a vehicle width direction (left-right direction) of the dashboard in the vehicle interior 2a. In the example illustrated in FIG. 1, the display unit 8 is covered by an operation input unit 10 capable of detecting coordinates of a position at which an indicator, such as a finger or a stylus, is in proximity (including a state of being in contact). Accordingly, the occupant can visually recognize an image displayed on the display unit 8, and inputs various operations by executing an input operation (for example, a touch operation) using the indicator on the operation input unit 10.

Further, as illustrated in FIG. 2, an imaging device 201 and an illumination device 203 are provided at a predetermined position in the vehicle interior 2a, more specifically, in a support unit 202 that supports the steering unit 303a. The imaging device 201 is configured, for example, as a charge coupled device (CCD) camera, and the illumination device 203 is configured, for example, as an infrared illumination.

Here, in the embodiment, the imaging device 201 and the illumination device 203 are integrally provided. Accordingly, the imaging device 201 and the illumination device 203 face a region in which there is a probability that the face of the driver X who is seated on the driving seat 2b from substantially the same position is present.

More specifically, the imaging device 201 is adjusted in angle and posture so as to be able to image a region in which there is a probability that the face of the driver X seated on the driving seat 2b is present, and the illumination device 203 is adjusted in angle and posture such that light can be emitted to the region in which there is a probability that the face of the driver X seated on the driving seat 2b is present.

The imaging device 201 periodically executes imaging of the face of the driver X at predetermined time intervals while the driving of the vehicle 1 is being performed, and sequentially outputs the captured image (corresponding to image data) obtained by imaging to an occupant monitoring device 310 (refer to FIGS. 3 and 4) which will be described later. Although the details will be described later, the occupant monitoring device 310 detects eyeball information on the eyeballs of the driver X, such as a pupil position (center position) of the driver X, based on the captured image obtained by imaging the imaging device 201. In addition, the occupant monitoring device 310 executes occupant monitoring processing including detection (and tracking of the detected sight line information) of sight line information on the sight line of the driver X, and monitors a change in sight line of the driver X, based on the detected eyeball information.

In the following, the occupant monitoring processing will be described which is executed based on the captured image obtained by the imaging device 201 and including the information on the region in which there is a probability that the face of the driver X seated on the driving seat 2b is present, but the occupant monitoring processing can also be executed for occupants other than the driver X. In other words, the occupant monitoring processing is executed in the same manner based on the captured image obtained by an imaging unit provided at a position different from that of the imaging device 201 and imaging a region in which there is a probability that faces of occupants seated on seats other than the driving seat 2b are present.

Next, with reference to FIG. 3, a system configuration of an occupant monitoring system 300 including the occupant monitoring device 310 that executes occupant monitoring processing will be described. In addition, the system configuration illustrated in FIG. 3 is merely an example, and can be set (changed) variously.

Figure 3:
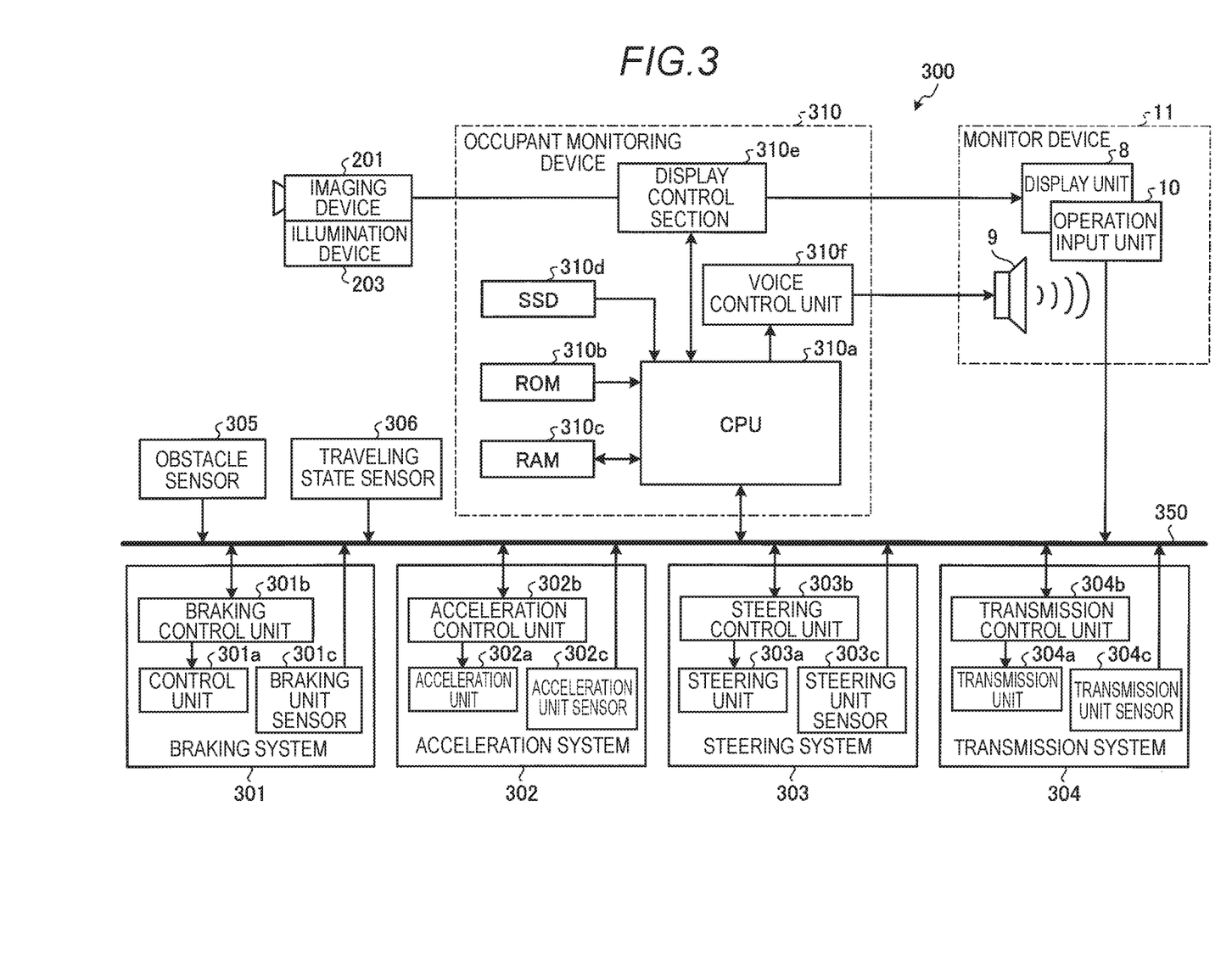
FIG. 3 is an exemplary schematic block diagram illustrating a system configuration of an occupant monitoring system according to the embodiment.

FIG. 3 is an exemplary schematic block diagram illustrating a system configuration of the occupant monitoring system 300 according to the embodiment. As illustrated in FIG. 3, the occupant monitoring system 300 includes a braking system 301, an acceleration system 302, a steering system 303, a transmission system 304, an obstacle sensor 305, a traveling state sensor 306, the imaging device 201, the monitor device 11, the occupant monitoring device 310, and an in-vehicle network 350.

The braking system 301 controls the deceleration of the vehicle 1. The braking system 301 includes a braking unit 301a, a braking control unit 301b, and a braking unit sensor 301c.

The braking unit 301a is a device for decelerating the vehicle 1, for example, a brake pedal or the like.

The braking control unit 301b is, for example, an electronic control unit (ECU) configured with a computer having a hardware processor, such as a CPU. For example, the braking control unit 301b drives an actuator (not illustrated) based on an instruction input via the in-vehicle network 350, and operates the braking unit 301a to control a degree of deceleration of the vehicle 1.

The braking unit sensor 301c is a device for detecting the state of the braking unit 301a. For example, in a case where the braking unit 301a is configured as a brake pedal, the braking unit sensor 301c detects the position of the brake pedal or the pressure that acts on the brake pedal as the state of the braking unit 301a. The braking unit sensor 301c outputs the detected state of the braking unit 301a to the in-vehicle network 350.

The acceleration system 302 controls the acceleration of the vehicle 1. The acceleration system 302 includes an acceleration unit 302a, an acceleration control unit 302b, and an acceleration unit sensor 302c.

The acceleration unit 302a is a device for accelerating the vehicle 1, for example, an accelerator pedal or the like.

The acceleration control unit 302b is, for example, an ECU configured with a computer having a hardware processor, such as a CPU. The acceleration control unit 302b drives an actuator (not illustrated) based on an instruction input via the in-vehicle network 350, and operates the acceleration unit 302a to control a degree of acceleration of the vehicle 1.

The acceleration unit sensor 302c is a device for detecting the state of the acceleration unit 302a. For example, in a case where the acceleration unit 302a is configured as an accelerator pedal, the acceleration unit sensor 302c detects the position of the accelerator pedal or the pressure that acts on the accelerator pedal. The acceleration unit sensor 302c outputs the detected state of the acceleration unit 302a to the in-vehicle network 350.

The steering system 303 controls an advancing direction of the vehicle 1. The steering system 303 includes a steering unit 303a, a steering control unit 303b, and a steering unit sensor 303c.

The steering unit 303a is a device that steers the steered wheels of the vehicle 1, such as a steering wheel.

The steering control unit 303b is, for example, an ECU configured with a computer having a hardware processor, such as a CPU. The steering control unit 303b drives an actuator (not illustrated) based on an instruction input via the in-vehicle network 350, and operates the steering unit 303a to control the advancing direction of the vehicle 1.

The steering unit sensor 303c is a device for detecting the state of the steering unit 303a. For example, in a case where the steering unit 303a is configured as a steering wheel, the steering unit sensor 303c detects the position of the steering wheel or the rotation angle of the steering wheel. In a case where the steering unit 303a is configured as a steering wheel, the steering unit sensor 303c may detect the position of the steering wheel or the pressure that acts on the steering wheel. The steering unit sensor 303c outputs the detected state of the steering unit 303a to the in-vehicle network 350.

The transmission system 304 controls a gear ratio of the vehicle 1. The transmission system 304 includes a transmission unit 304a, a transmission control unit 304b, and a transmission unit sensor 304c.

The transmission unit 304a is, for example, a device, such as a shift lever, for changing the gear ratio of the vehicle 1.

The transmission control unit 304b is, for example, an ECU configured with a computer having a hardware processor, such as a CPU. The transmission control unit 304b drives an actuator (not illustrated) based on an instruction input via the in-vehicle network 350, and operates the transmission unit 304a to control the gear ratio of the vehicle 1.

The transmission unit sensor 304c is a device for detecting the state of the transmission unit 304a. For example, in a case where the transmission unit 304a is configured as a shift lever, the transmission unit sensor 304c detects the position of the shift lever or the pressure that acts on the shift lever. The transmission unit sensor 304c outputs the detected state of the transmission unit 304a to the in-vehicle network 350.

The obstacle sensor 305 is a device for detecting information on obstacles that may exist around the vehicle 1. The obstacle sensor 305 includes, for example, a distance measurement sensor, such as a sonar that detects the distance to the obstacle. The obstacle sensor 305 outputs the detected information to the in-vehicle network 350.

The traveling state sensor 306 is a device for detecting the traveling state of the vehicle 1. The traveling state sensor 306 includes, for example, a vehicle wheel sensor that detects a wheel speed of the vehicle 1, an acceleration sensor that detects an acceleration in the front-rear direction or left-right direction of the vehicle 1, and a gyro sensor that detects a turning speed (angular velocity) of the vehicle 1. The traveling state sensor 306 outputs the detected traveling state to the in-vehicle network 350.

The occupant monitoring device 310 is a device for controlling the occupant monitoring system 300 in an integrated manner. The occupant monitoring device 310 monitors the change in sight line of the driver X by executing the occupant monitoring processing including detection (and tracking of the detected sight line information) of the sight line information on the sight line of the driver X based on the captured image obtained by the imaging device 201.

The occupant monitoring device 310 is configured as an ECU including a central processing unit (CPU) 310a, a read only memory (ROM) 310b, a random access memory (RAM) 310c, a solid state drive (SSD) 310d, a display control section 310e, and a voice control unit 310f.

The CPU 310a is a hardware processor that controls the occupant monitoring device 310 in an integrated manner. The CPU 310a reads various control programs (computer programs) stored in the ROM 310b or the like, and realizes various functions in accordance with instructions specified in the various control programs. The various control programs include an occupant monitoring program for realizing the occupant monitoring processing.

The ROM 310b is a non-volatile main storage device that stores parameters and the like necessary for executing the above-described various control programs.

The RAM 310c is a volatile main storage device that provides a work region of the CPU 310a.

The SSD 310d is a rewritable non-volatile auxiliary storage device. In the occupant monitoring device 310 according to the embodiment, as an auxiliary storage device, instead of (or in addition to) the SSD 310d, a hard disk drive (HDD) may be provided.

The display control section 310e mainly performs image processing with respect to the captured image obtained from the imaging device 201, generation of the image data to be output to the display unit 8 of the monitor device 11, and the like among various types of processing that can be executed by the occupant monitoring device 310.

The voice control unit 310f mainly performs generation of voice data to be output to the voice output unit 9 of the monitor device 11 among various types of processing that can be executed by the occupant monitoring device 310.

The in-vehicle network 350 is connected to the braking system 301, the steering system 302, the acceleration system 303, the transmission system 304, the obstacle sensor 305, the traveling state sensor 306, the operation input unit 10 of the monitor device 11, and the occupant monitoring device 310, in a manner of being capable of communicating therewith.

Here, the related art discloses a method for detecting the eyeball information, using two types of illumination including illumination for emitting light toward the face (eyes) of an occupant from a direction the same as an imaging direction and illumination for emitting light toward the face (eyes) of the occupant from a direction different from the imaging direction, based on a difference between two types of captured images including a captured image acquired when the light is emitted by the former illumination and a captured image acquired when the light is emitted by the latter illumination.

In general, in the captured image, the eyes appear as red eyes or in other forms in accordance with the condition of the light, and thus, according to the technique of the related art using the two types of illumination as described above, it becomes possible to detect the eyeball information regardless of variations in how the eyes appear in the captured image.

However, in the related art described above, in order to emit the light from different directions to the same position, it is necessary to dispose the two types of illumination at positions separated from each other to some extent, and thus, the degree of freedom in design and layout of a vehicle interior deteriorates while detection accuracy of eyeball information is ensured.

Here, by configuring the occupant monitoring device 310 as will be described in the following FIG. 4, the embodiment realizes to detect the eyeball information with high accuracy without deterioration of the degree of freedom in design and layout in the vehicle interior 2a. The occupant monitoring device 310 is an example of an eyeball information detection device.

Figure 4:
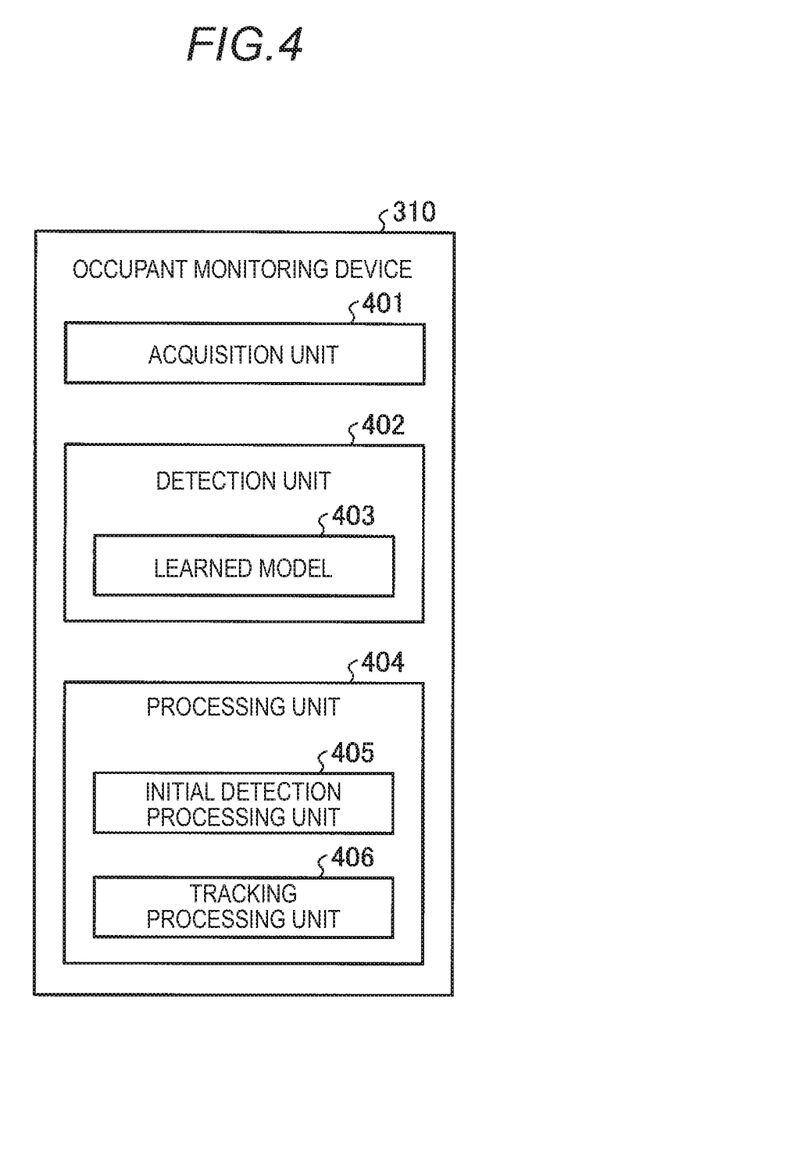
FIG. 4 is an exemplary schematic block diagram illustrating a function of an occupant monitoring device according to the embodiment.

FIG. 4 is an exemplary schematic block diagram illustrating a function of the occupant monitoring device 310 according to the embodiment. The functions illustrated in FIG. 4 are realized by the cooperation of software and hardware. In other words, in the example illustrated in FIG. 4, the function of the occupant monitoring device 310 is realized as a result of the CPU 310a reading and executing a predetermined control program stored in the ROM 310b or the like. In the embodiment, at least a part of the functions illustrated in FIG. 4 may be realized by dedicated hardware (circuit).

As illustrated in FIG. 4, the occupant monitoring device 310 according to the embodiment includes an acquisition unit 401, a detection unit 402, and a processing unit 404.

The acquisition unit 401 continuously acquires the captured images obtained by the imaging device 201 a plurality of times at predetermined control timing. As described above, the captured image includes the information of the region in which there is a probability that the face of the driver X is present in the vehicle 1.

The detection unit 402 has a learned model 403, and based on the learned model 403, the captured image acquired by the acquisition unit 401 is input, and the eyeball information that corresponds to the captured image is output. In the embodiment, the detection unit 402 outputs the eyeball information that corresponds to the captured image regardless of whether or not the eyeball appears as a red eye in the captured image based on the learned model 403 generated as follows.

The learned model 403 is generated, for example, by learning a learning image captured under the same conditions as the captured image acquired by the acquisition unit 401 and including information similar to that of the captured image, and a correct value of the eyeball information on the eyeball of the driver X that appears in the learning image, by machine learning. More specifically, the learned model 403 is generated by learning the learning image including a first image in which the eyeball appears as a red eye and a second image in which the eyeball appears in forms other than a red eye, and the correct values of the eyeball information that correspond to each of the first image and the second image as the learning image. In addition, the machine learning for generating the learned model 403 may be supervised learning, unsupervised learning, reinforcement learning, a combination of one or more of these three learning schemes, or the like.

Here, specific examples of the first image and the second image will be briefly described.

Figure 5:
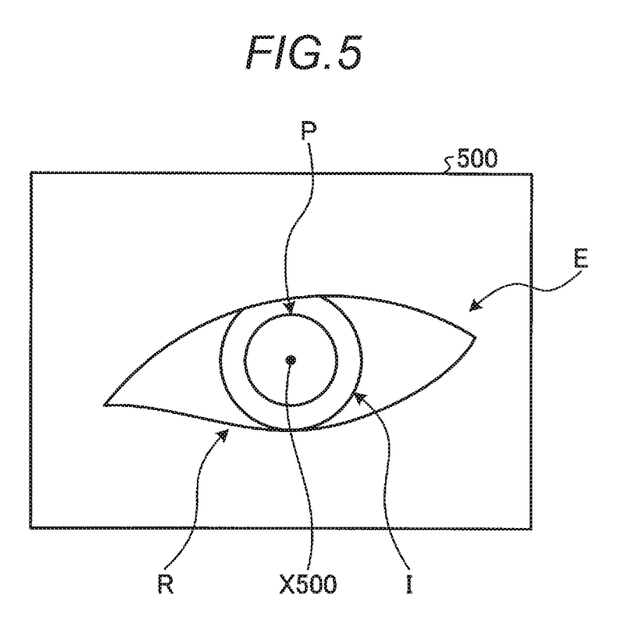
FIG. 5 is an exemplary schematic diagram illustrating an example of a red eye image according to the embodiment.

FIG. 5 is an exemplary schematic view illustrating an example of the first image according to the embodiment. An image 500 illustrated in FIG. 5 corresponds to the first image since a peripheral region including a pupil P in an eye E of the driver X appears as a red eye R different from a normal black eye B (refer to FIG. 6). In the embodiment, the learned model 403 is generated as a model that outputs coordinates of a center position X500 of the pupil P that appears as the red eye R in the image 500 in a case where the image 500 is input.

Figure 6:
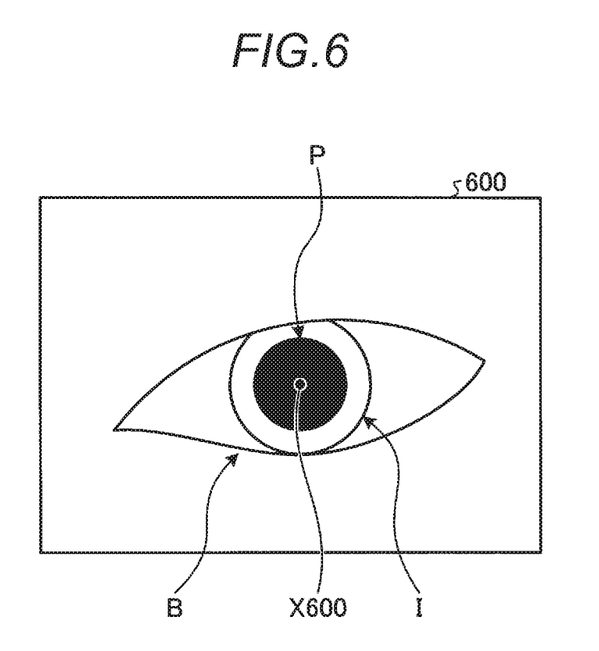
FIG. 6 is an exemplary schematic view illustrating an example of a black eye image according to the embodiment.

In addition, FIG. 6 is an exemplary schematic view illustrating an example of a second image according to the embodiment. The image 600 illustrated in FIG. 6 corresponds to the second image because the peripheral region of the pupil P of the eye E of the driver X appears as the normal black eye B. In the embodiment, the learned model 403 is generated as a model that outputs coordinates of a center position X600 of the pupil P that appears as the black eye B in the image 600 in a case where the image 600 is input.

In this manner, in the embodiment, regardless of how the eyeball appears in the learning image, more specifically, whether the eye E appears as the red eye R or the black eye B in the learning image, by learning the correct value of the center position of the pupil P in the learning image, the learned model 403 is generated. Therefore, the detection unit

402 using the learned model 403 can output the center position of the pupil in the captured image with high accuracy as the eyeball information regardless of how the eyeball appears in the captured image.

Figure 7:
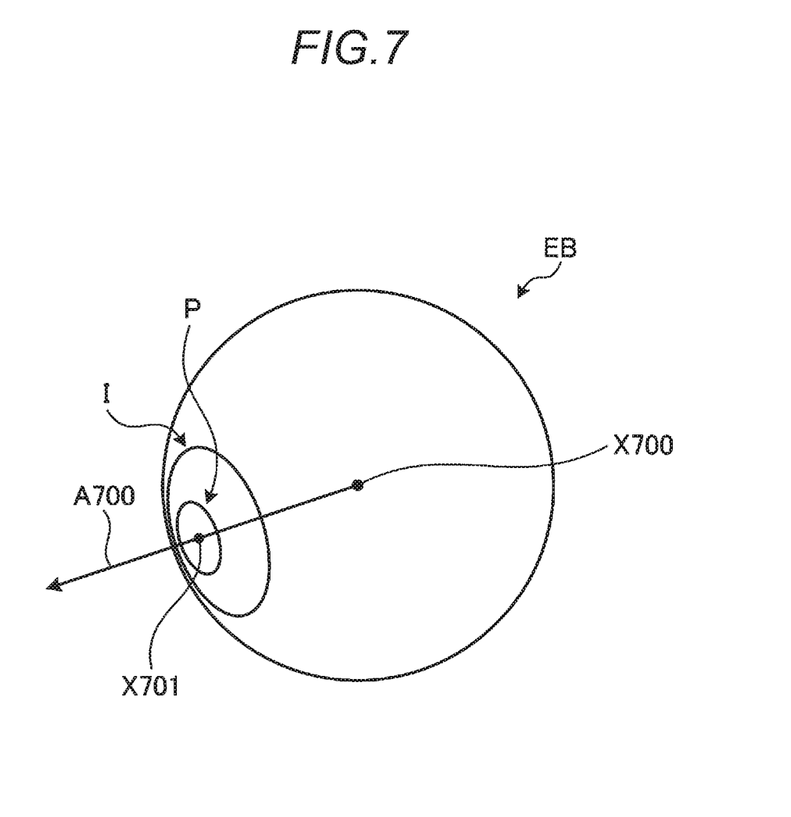
FIG. 7 is an exemplary schematic view illustrating an example of a sight line detection method according to the embodiment.

Incidentally, as illustrated in FIG. 7 below, when the center position of the pupil is used, it is possible to easily detect the direction of the sight line as an example of the above-described sight line information.

FIG. 7 is an exemplary schematic view illustrating an example of a sight line detection method according to the embodiment. As illustrated in FIG. 7, when a center position X700 of an eyeball EB configured as a three-dimensional model and a center position X701 of the pupil P inside an iris I are known, the direction of the sight line can be detected as a direction A700 from the center position X700 of the eyeball model to the center position X701 of pupil P.

The center position X700 of the eyeball EB can be stored as one of the parameters of the three-dimensional model acquired as data representing the structure including the three-dimensional shape of the face of the driver X, and the center position X701 of the pupil P can be obtained based on the above-described learned model 403.

Returning to FIG. 4, the processing unit 404 executes processing of monitoring the change in the sight line of the driver X by detecting the direction of the sight line by the above-described method and by detecting the change thereof, as the occupant monitoring processing. Hereinafter, the functions of the processing unit 404 will be described in more detail.

The processing unit 404 has functional modules that respectively correspond to two control modes: an initial detection mode in which face information is first detected from the captured image as an initial stage of the occupant monitoring processing; and a tracking mode in which tracking of face information detected in the initial detection processing is executed.

In other words, the processing unit 404 has an initial detection processing unit 405 which executes the initial detection processing as processing that corresponds to the initial detection mode, and a tracking processing unit 406 which executes the tracking processing as processing that corresponds to the tracking mode.

The control mode of the processing unit 404 is set to the initial detection mode, for example, in a case where the acquisition unit 401 acquires the captured image.

In the initial detection mode, the initial detection processing unit 405 of the processing unit 404 acquires the center position of the pupil as the eyeball information detected by the detection unit 402, acquires the center position of the eyeball by executing fitting based on the three-dimensional model acquired as data representing the structure including the three-dimensional shape of the face, and detects the direction of the sight line as the sight line information based on the two acquired center positions. In addition, fitting is processing of appropriately adjusting parameters indicating the three-dimensional model so as to match feature points of the captured image.

In addition, when the sight line information is normally detected by the initial detection processing unit 405, the control mode of the processing unit 404 is set to the tracking mode.

In the tracking mode, the tracking processing unit 406 of the processing unit 404 executes tracking of the sight line information detected in the initial detection processing based on the detection result of the detection unit 402 with respect to the captured image to be acquired next, and the fitting of the captured image to be acquired next and the above-described three-dimensional model.

Hereinafter, more detailed contents of the initial detection processing and the tracking processing according to the embodiment will be described with a flowchart.

First, the details of the initial detection processing will be described.

Figure 8:
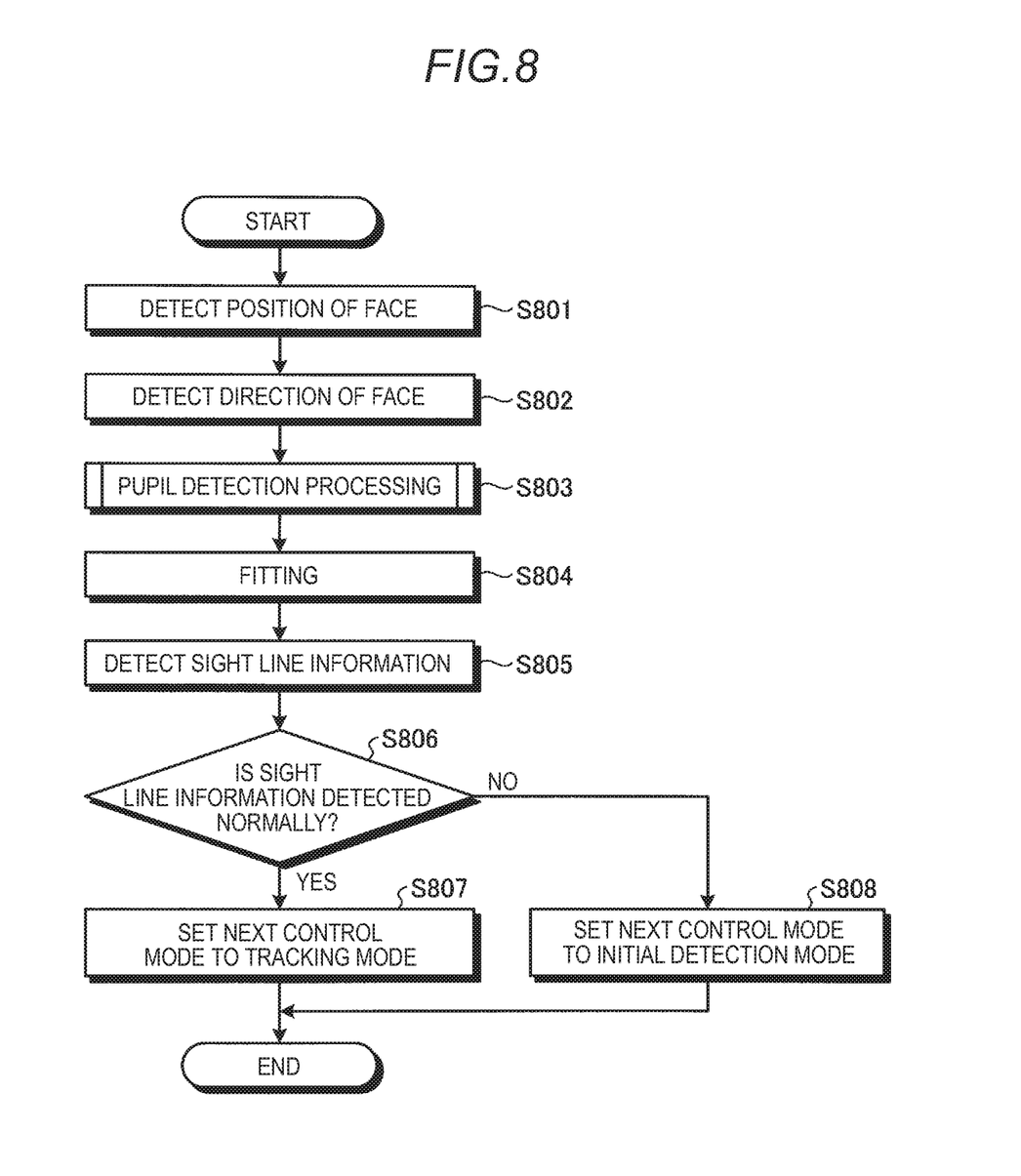
FIG. 8 is an exemplary schematic flowchart illustrating initial detection processing executed by the occupant monitoring device according to the embodiment.

FIG. 8 is an exemplary schematic flowchart illustrating the initial detection processing executed by the occupant monitoring device 310 according to the embodiment. The initial detection processing is executed, for example, in a case where the control mode of the processing unit 404 is set to the initial detection mode and the acquisition unit 401 acquires the captured image.

As illustrated in FIG. 8, in the initial detection processing, first, in S801, the initial detection processing unit 405 detects the position of the face in the captured image.

Then, in S802, the initial detection processing unit 405 detects the direction of the face in the captured image.

Then, in step S803, the detection unit 402 executes pupil detection processing for detecting the center position of the pupil that appears in the captured image based on the captured image. Since the specific contents of the pupil detection processing will be described later, here, the description thereof will be omitted.

Then, in S804, the initial detection processing unit 405 executes the fitting of the captured image and the three-dimensional model acquired as data representing the structure including a three-dimensional shape of the face. Accordingly, the center position of the eyeball is detected. In addition, the fitting in the initial detection processing is executed based on, for example, an initial model preset as statistical data representing the structure including the three-dimensional shape of the face.

Then, in S805, the initial detection processing unit 405 detects the sight line information on the direction of the sight line of the driver X based on the center position of the pupil detected as a result of the pupil detection processing in S803 and the center position of the eyeball detected, based on the result of fitting in S804.

In addition, in S806, the initial detection processing unit 405 determines whether or not the sight line information is detected normally. For example, the initial detection processing unit 405 calculates a value (score) indicating the reliability for each of a series of processing most recently executed to detect the sight line information, and executes the determination of S806 based on the score.

In a case where it is determined in S806 that the sight line information is detected normally, the processing proceeds to S807. In addition, in S807, the initial detection processing unit 405 sets the next control mode of the processing unit 404 to the tracking mode. Then, the process ends.

Meanwhile, in a case where it is determined in S806 that the sight line information is not detected normally, the processing proceeds to S808. In addition, in S808, the initial detection processing unit 405 sets the next control mode of the processing unit 404 to the initial detection mode. Then, the process ends.

Next, the details of the tracking processing will be described.

Figure 9:
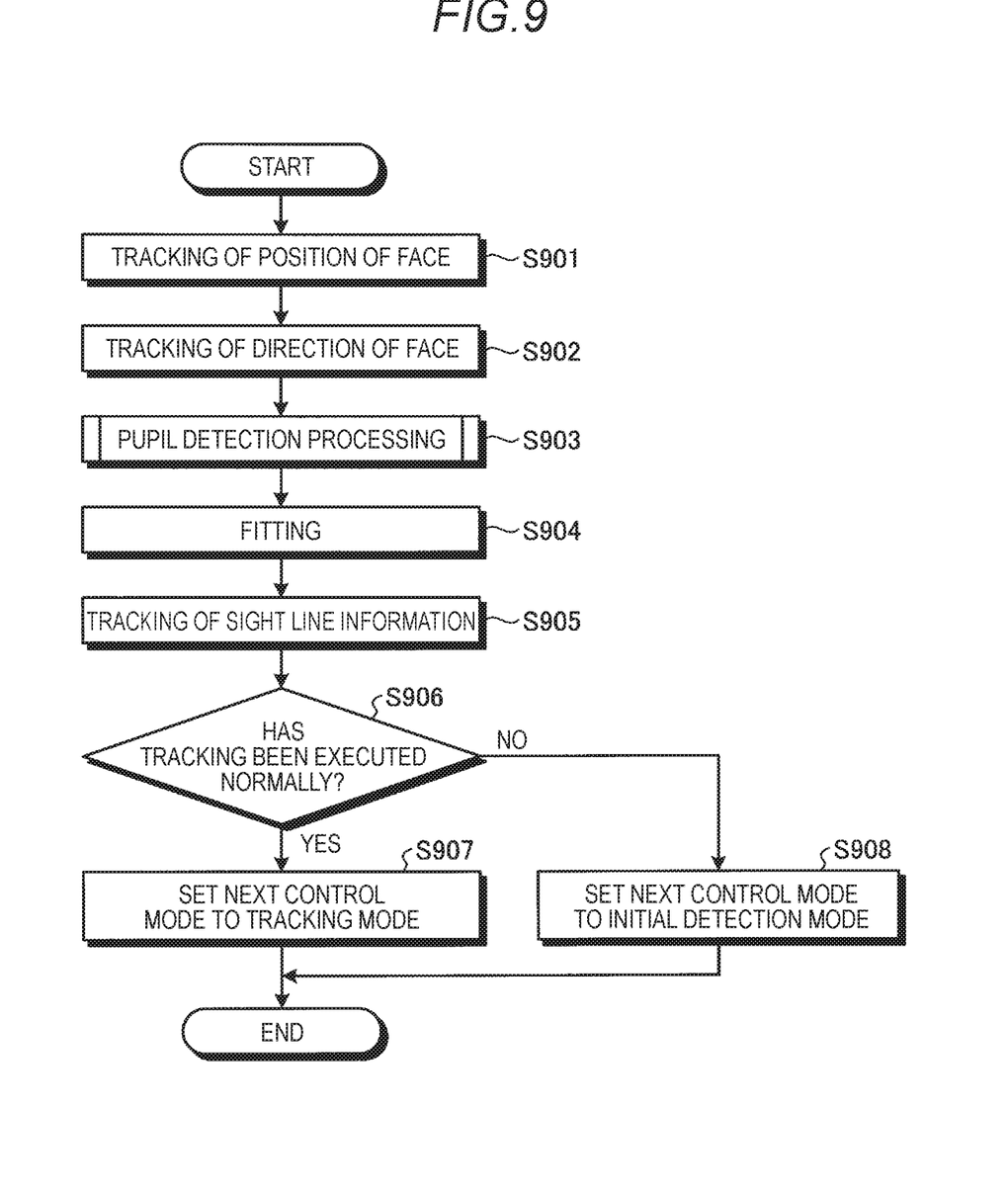
FIG. 9 is an exemplary schematic flowchart illustrating tracking processing executed by the occupant monitoring device according to the embodiment.

FIG. 9 is an exemplary schematic flowchart illustrating the tracking processing executed by the occupant monitoring device 310 according to the embodiment. The tracking processing is executed, for example, in a case where the control mode of the processing unit 404 is set to the tracking mode and the acquisition unit 401 acquires the captured image.

As illustrated in FIG. 9, in the tracking processing, first, in step S901, the tracking processing unit 406 executes tracking of the position of the face in the captured image. In addition, using various detection results in the initial detection processing, the tracking can limit a search range, use a template for matching, or specify a changed part based on a difference between consecutive frames. Therefore, in general, the processing speed of the tracking is faster than that of various detections in the initial detection processing.

Then, in step S902, the tracking processing unit 406 executes the tracking of the orientation of the face in the captured image.

Then, in S903, the detection unit 402 executes the pupil detection processing for detecting the center position of the pupil that appears in the captured image based on the captured image. Since the specific contents of the pupil detection processing will be described later, here, the description thereof will be omitted.

Then, in step S904, the tracking processing unit 406 executes the fitting of the captured image and the three-dimensional model acquired as data representing the structure including the three-dimensional shape of the face. Accordingly, the center position of the eyeball is detected. In addition, the fitting in the tracking processing is executed, for example, based on the latest three-dimensional model after adjustment in the previous initial detection processing or tracking processing.

Then, in step S905, the tracking processing unit 406 executes the tracking of the sight line information on the direction of the sight line of the driver X based on the center position of the pupil detected as a result of the pupil detection processing in step S803 and the center position of the eyeball detected based on the result of fitting in step S804.

In addition, in step S906, the tracking processing unit 406 determines whether the tracking of the sight line information has been normally executed. For example, the tracking processing unit 406 calculates the value (score) indicating the reliability for each of the series of processing most recently executed for the tracking the sight line information, and executes the determination of S906 based on the score.

In a case where it is determined in S906 that the tracking of the sight line information is normally executed, the processing proceeds to S907. Then, in S907, the tracking processing unit 406 sets the next control mode of the processing unit 404 to the tracking mode. Then, the process ends.

Meanwhile, in a case where it is determined in S906 that the tracking of the face information is not executed normally, the process proceeds to S908. Then, in step S908, the tracking processing unit 406 sets the next control mode of the processing unit 404 to the initial detection mode. Then, the process ends.

Lastly, the details of the pupil detection processing executed in the above-described S803 and S903 will be described.

Figure 10:
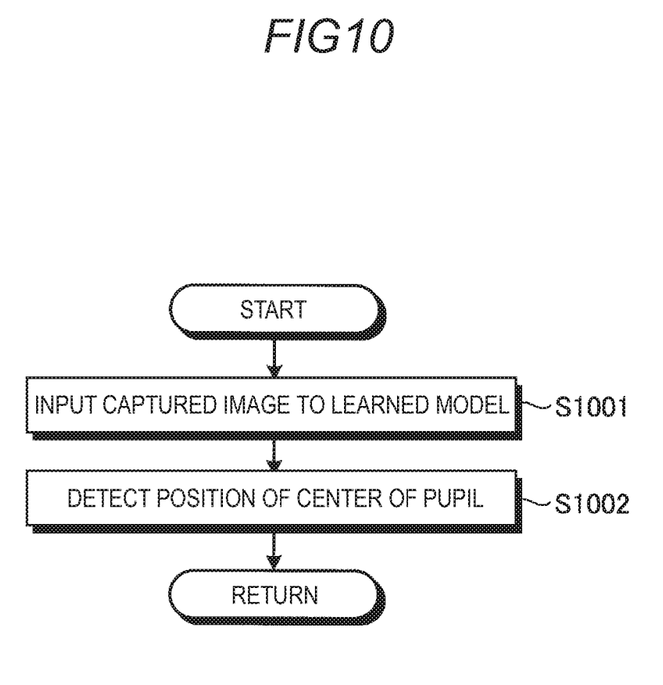
FIG. 10 is an exemplary schematic flowchart illustrating pupil detection processing executed by the occupant monitoring device according to the embodiment.

FIG. 10 is an exemplary schematic flowchart illustrating a pupil detection processing executed by the occupant monitoring device 310 according to the embodiment.

As illustrated in FIG. 10, in the pupil detection processing, first, in S1001, the detection unit 402 inputs the captured image acquired by the acquisition unit 401 to the learned model 403.

Then, in S1002, the detection unit 402 detects the output from the learned model 403 that corresponds to the input in S1001 as the position of the center of the pupil.

When the processing of S1002 is completed, the processing of the above-described S803 and S903 are completed, and the processing returns to the above-described S804 and S904.

As described above, the occupant monitoring device 310 according to the embodiment includes the acquisition unit 401, the detection unit 402, and the processing unit 404. The acquisition unit 401 acquires the captured image obtained by imaging the region in which there is a probability that the face of the driver X as an occupant is present in the vehicle 1 by the imaging device 201 provided in proximity to the illumination device 203 that emits light to the region. The detection unit 402 outputs the eyeball information that corresponds to the captured image receiving the captured image acquired by the acquisition unit 401 as an input based on the learned model 403 generated by learning the learning image including information similar to the captured image acquired by the acquisition unit 401 and the correct value of the eyeball information on the eyeballs of the driver X appearing in the learning image, by machine learning. The processing unit 404 monitors the change in the sight line of the occupant driver X based on the eyeball information output from the detection unit 402.

According to the occupant monitoring device 310 of the embodiment, it is possible to easily obtain an output based on the correct value of the eyeball information by using the learned model 403 in a configuration in which the illumination device 203 and the imaging device 201 are provided in proximity to each other. Therefore, it is possible to detect the eyeball information with high accuracy and to monitor the change in the sight line of the driver X with high accuracy, without deterioration of the degree of freedom in design and layout in the vehicle interior 2a.

In the occupant monitoring device 310 of the embodiment, the detection unit 402 outputs the eyeball information that corresponds to the captured image regardless of whether or not the eyeball appears as a red eye in the captured image based on the learned model 403 generated based on the learning image including the first image in which the eyeball appears as a red eye and the second image in which the eyeball appears in forms other than the red eye, and the correct values of the eyeball information that correspond to each of the first image and the second image as the learning image. According to such a configuration, it is possible to detect the eyeball information with high accuracy regardless of whether or not the eyeball appears as a red eye in the captured image.

In addition, in the occupant monitoring device 310 of the embodiment, the detection unit 402 outputs the pupil position as the eyeball information. According to such a configuration, it is possible to detect the pupil position with high accuracy.

In addition, in the occupant monitoring device 310 of the embodiment, the acquisition unit 401 acquires the captured image obtained by the imaging device 201 provided integrally with the illumination device 203 at a predetermined position in the vehicle interior 2a. According to such a configuration, since the illumination device 203 and the imaging device 201 are integrated and integrally disposed, it is possible to detect the eyeball information with high accuracy while further suppressing the deterioration of the degree of freedom in design and layout in the vehicle interior 2a.

In addition, in the above-described embodiment, as an example of the eyeball information detection device, the occupant monitoring device 310 including the acquisition unit 401, the detection unit 402, and the processing unit 404 is exemplified. However, as another embodiment, a configuration in which a device having the acquisition unit 401 and the detection unit 402 and not having the processing unit 404 is used as the eyeball information detection device is also considered.

In the above-described eyeball information detection device, the detection unit may output the eyeball information that corresponds to the captured image regardless of whether or not the eyeball appears as a red eye in the captured image based on the learned model generated based on the learning image including a first image in which the eyeball appears as the red eye and a second image in which the eyeball appears in forms other than the red eye, and correct values of the eyeball information that correspond to each of the first image and the second image as the learning image. According to such a configuration, it is possible to detect the eyeball information with high accuracy regardless of whether or not the eyeball appears as a red eye in the captured image.

In the above-described eyeball information detection device, the detection unit may output a pupil position as the eyeball information. According to such a configuration, it is possible to detect the pupil position with high accuracy.

In the above-described eyeball information detection device, the acquisition unit may acquire the captured image obtained by the imaging device provided integrally with the illumination device at a predetermined position in a vehicle interior. According to such a configuration, since the illumination device and the imaging device are integrated and integrally disposed, it is possible to detect the eyeball information with high accuracy while further suppressing the deterioration of the degree of freedom in design and layout in the vehicle interior.

Above, although the embodiment of the disclosure has been described, the above-described embodiment is merely an example, and does not limit the range of disclosure. The above-described novel embodiment can be implemented in various forms, and various omissions, substitutions, and modifications can be made without departing from the scope of the disclosure. The above-described embodiment and the modification thereof are included in the scope and the gist of the disclosure, and are included in the disclosure described in the claims and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An eyeball information detection device comprising:
at least one hardware processor configured to implement:
an acquisition unit configured to acquire a captured image obtained by imaging a region in which there is a probability that a face of an occupant is present in a vehicle by an imaging device provided in proximity to an illumination device that emits light to the region; and
a detection unit configured to output eyeball information that corresponds to the captured image by receiving the captured image acquired by the acquisition unit as an input based on a learned model generated by learning a learning image including information similar to the captured image acquired by the acquisition unit and a correct value of the eyeball information on an eyeball of the occupant appearing in the learning image, by machine learning,
wherein the detection unit outputs a center position of a pupil that corresponds to the captured image regardless of whether or not the eyeball appears as a red eye in the captured image based on the learned model generated based on the learning image including a first image in which the eyeball appears as the red eye and a second image in which the eyeball appears in forms other than the red eye, and the correct values of the center position of the pupil that correspond to each of the first image and the second image as the learning image.

2. An eyeball information detection method comprising:
an acquiring step of acquiring a captured image obtained by imaging a region in which there is a probability that a face of an occupant is present in a vehicle by an imaging device provided in proximity to an illumination device that emits light to the region; and
a detecting step of outputting eyeball information that corresponds to the captured image by receiving the captured image acquired in the acquiring step as an input based on a learned model generated by learning a learning image including information similar to the captured image acquired in the acquiring step and a correct value of the eyeball information on eyeballs of the occupant appearing in the learning image, by machine learning,
wherein the detection unit outputs a center position of a pupil that corresponds to the captured image regardless of whether or not the eyeball appears as a red eye in the captured image based on the learned model generated based on the learning image including a first image in which the eyeball appears as the red eye and a second image in which the eyeball appears in forms other than the red eye, and the correct values of the center position of the pupil that correspond to each of the first image and the second image as the learning image.

3. An occupant monitoring device comprising:
at least one hardware processor configured to implement:
an acquisition unit configured to acquire a captured image obtained by imaging a region in which there is a probability that a face of an occupant is present in a vehicle by an imaging device provided in proximity to an illumination device that emits light to the region;
a detection unit configured to output eyeball information that corresponds to the captured image by receiving the captured image acquired by the acquisition unit as an input based on a learned model generated by learning a learning image including information similar to the captured image acquired by the acquisition unit and a correct value of the eyeball information on an eyeball of the occupant appearing in the learning image by machine learning; and
a processing unit that monitors a change in a sight line of the occupant based on the eyeball information output from the detection unit,
wherein the detection unit outputs a center position of a pupil that corresponds to the captured image regardless of whether or not the eyeball appears as a red eye in the captured image based on the learned model generated based on the learning image including a first image in which the eyeball appears as the red eye and a second image in which the eyeball appears in forms other than the red eye, and the correct values of the center position of the pupil that correspond to each of the first image and the second image as the learning image.

* * * * *